Nov. 14, 1972   R. M. RICHARDSON   3,702,647
FREQUENCY SENSITIVE SUSPENSION SYSTEM FLUID DAMPER
Filed Oct. 5, 1970   5 Sheets-Sheet 1

INVENTOR
RAYMOND M. RICHARDSON
BY John R. Faulkner
Robert W. Brown
ATTORNEYS

United States Patent Office 3,702,647
Patented Nov. 14, 1972

3,702,647
FREQUENCY SENSITIVE SUSPENSION SYSTEM FLUID DAMPER
Raymond M. Richardson, 91 Norsey View Drive, Billericay, England
Filed Oct. 5, 1970, Ser. No. 77,777
Claims priority, application Great Britain, Jan. 6, 1970, 550/70
Int. Cl. F16d 57/00
U.S. Cl. 188—283                    2 Claims

ABSTRACT OF THE DISCLOSURE

A frequency sensitive fluid damper for a vehicle suspension system is described. The damper responds to relatively high frequency wheel movements with a relatively low degree of damping and to relatively low frequency body movements with a higher degree of damping. The damper may include a housing having a pair of cylinders with movable pistons simultaneously actuated by a lever arm attached to the wheel carriers. The cylinders are fluidly connected to a valve having a spool which responds to low frequency movements, but which does not follow high frequency movements. Change in the valve spool position changes the amount of restriction to fluid flow from one cylinder to the other. The amount of restriction determines the degree of damping. Motion is transmitted to the valve spool through resilient means linked to the lever arm. The valve body may be made movable within the housing to adjust for variations in vehicle loading.

BACKGROUND OF THE INVENTION

This invention relates to fluid dampers, or shock absorbers, for use in motor vehicle suspension systems. More particularly, it relates to a frequency sensitive fluid damper.

In a motor vehicle, shock absorbers, or, dampers, are connected between the vehicle body and the axle or wheel carrier and are required to damp body movements characterized by a relatively low resonant frequency and wheel movements which have a relatively high frequency. Shock absorbers are comprised of two basic parts, one of which is attached to the vehicle body and the other of which is attached to the axle or wheel carrier. Shock absorbers reduce suspension system oscillations through the absorption of mechanical energy which is converted into heat energy when the shock absorber forces fluid through an orifice or a restriction.

Shock absorbers currently used in motor vehicle suspensions are velocity responsive in that the damping force which they exert depends mainly on the velocity of relative movement of the two basic parts. If a conventional velocity responsive damper is adjusted to provide optimum damping of body movements, it has a high degree of damping which is necessary in order to control a heavy mass moving relatively slowly. Such high damping produces a harsh ride over rough surfaces because the rapid wheel movements produced by rough surfaces produce high damping forces in the shock absorbers and these forces are transmitted to the body. If the amount of damping is reduced to the optimum value necessary to damp the wheel movements without creating excessive damping forces, then there is insufficient damping of the body movements with consequent vehicle instability. The shock absorber setting must therefore be a compromise between obtaining good stability at the expense of ride comfort or ride comfort at the expense of stability.

In order to facilitate understanding of the invention in the specification which follows, it should be understood that the term "jounce" refers to movement of the axle or wheel carrier of the vehicle toward the body and that the term "rebound" refers to movement of the axle or wheel carrier away from the vehicle body.

SUMMARY OF THE INVENTION

A shock absorber constructed in accordance with the invention comprises a pair of chambers having piston means movable within the chambers from an intermediate position to either of two opposed extreme positions, thereby, to define enclosed volumes. A passage containing a valve interconnects the enclosed chamber volumes. The valve variably restricts the flow of fluid from one of the chambers into the other chamber and the vice versa. The valve is provided with movable means which controls the degree of restriction to the flow of fluid between the two chambers through the passage.

The two basic parts of the fluid damper of the invention are input means attached to the piston means and the housing. One of these two parts is attached to the vehicle body and the other is attached to the axle or wheel carrier. Movement of the input means produces movement of the piston means to simultaneously increase the enclosed volume of one of the chambers and to decrease the enclosed volume of the other chamber. This causes fluid to flow from the chamber which decreases in volume, through the passage and the valve, to the other chamber which increases in volume.

When fluid flows through the passage in response to movement of the input means, it must pass through the valve restriction controlled by the movable valve means. The movable valve means is attached to the input means through a resilient device, such as a spring. The combination of the movable valve means with the resilient device constitutes a spring-mass system which preferably is responsive to low frequency movements of the input means, but which preferably is not responsive to high frequency movements of the input means. Preferably, the movable valve means has an intermediate position at which the degree of damping of the shock absorber is at minimum, and the degree of damping progressively increases as the movable valve means moves aawy from this intermediate position. Thus, the fluid damper of the invention can be arranged to respond to relatively high frequency wheel movements with a relatively low degree of damping, and it can respond to a relatively low frequency body movement with a higher degree of damping.

The invention will be better understood by reference to the detailed description which follows and to the drawings.

DETAILED DESCRIPTION

Figure 1:
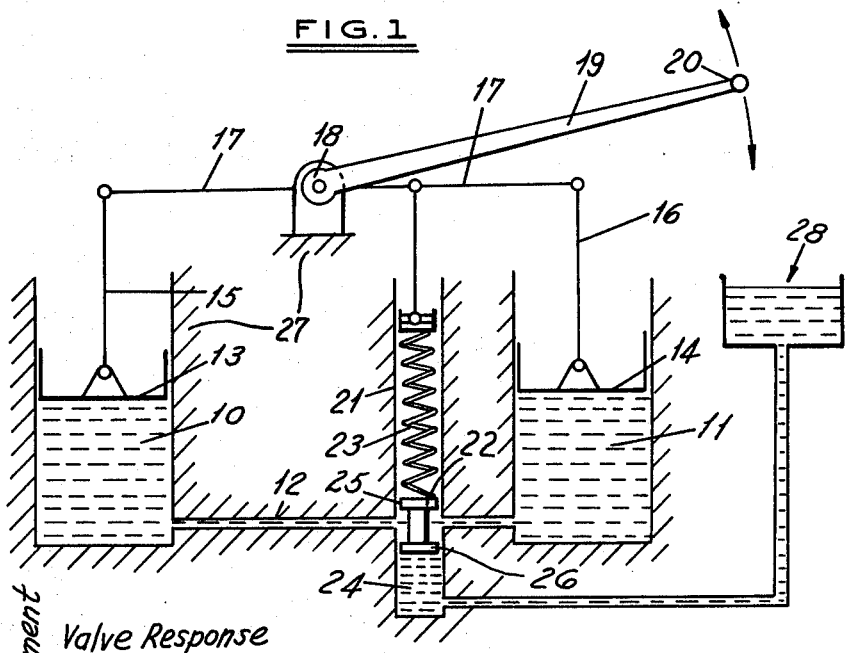
FIG. 1 is a diagrammatic sectional view of a lever-arm type of fluid damper which illustrates the principle of the invention.
Figure 2:
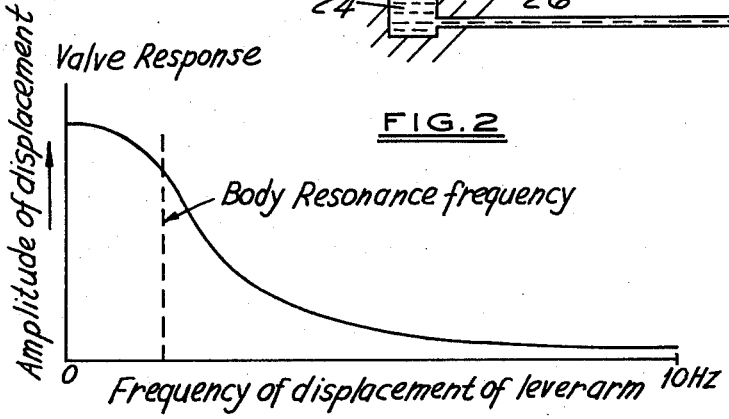
FIG. 2 is a graph showing the variation of the amplitude of valve movement with frequency of displacement in a fluid damper embodying the invention.

With reference to FIG. 1, a housing 27 for attachment to the body of a motor vehicle is formed with a jounce chamber or cylinder 10 and a rebound chamber or cylinder 11, these chambers being connected by a passage 12. Pistons 13 and 14 working in the chambers 10 and 11, respectively, are connected by connecting rods 15 and 16 to opposite ends of a beam or rocker arm 17. The beam is pivotally mounted on the housing 27 at point 18. A lever arm 19 is mounted for pivotal movement with the beam 17. When the damper is in use, the free end 20 of the lever is pivotally connected to an axle or wheeel carrier of the vehicle. A bore 21 in the casing communicates with the passage 12. A valve spool 22 is slidably mounted in the bore 21. Resilient means in the form of a spring 23 is located in the upper part of the bore 21 and is attached at one end to beam 17 and at the other end to the valve spool 22. Fluid damping for the valve spool 22 is obtained by a fluid-filled chamber 24 in the lower part of the bore 21, such lower part being filled with fluid from a reservoir 28. The combination of the valve spool 22, the spring 23, and the fluid-filled damping chamber 24 constitutes a damped spring-mass system. Movement of the valve spool 22 relative to the housing 27 is damped such that the response of the valve to movements of lever arm 19 of varying frequency is as shown in the graph of FIG. 2. The graph depicts the amplitude of the displacement of the valve spool 22 plotted against the frequency of displacement of the lever arm 19. The typical body resonance frequency is indicated by a broken line in the graph of FIG. 2. As is clearly shown, the valve spool 22 has negligible response to high frequency lever arm movements of the suspension, that is, at lever arm frequencies above about 5 Hz. corresponding to wheel movements in the suspension. However, the valve spool 22 follows movements of the lever arm at frequencies of about 2 Hz. and below, these movements corresponding to body movements of the suspension system.

The valve spool 22 has an intermediate position (as is shown in FIG. 1) at which it is in equilibrium, the lever arm 19 being in its position for zero suspension displacement. The degree of damping produced by the shock absorber is minimum when the valve is in its intermediate position and increases for movements of the lever arm 19 in either the jounce or rebound direction away from the intermediate position. This occurs because the valve spool 22 is provided with lands 25 and 26 which partially obstruct the flow of fluid from chamber 10 through the valve to chamber 11 or vice versa.

In operation, high frequency movements of the lever arm 19 produce little displacement of the valve spool 22 and are subjected to the low degree of damping corresponding to the intermediate position of the valve spool. However, low frequency body movement may produce sufficient displacement of the valve spool 22 from its intermediate position to cause the body movement to be subjected to a higher degree of damping. In such case, high frequency movements occurring when the valve spool 22 is displaced by a low frequency body movement are also subjected to the higher degree of damping.

Figure 3:
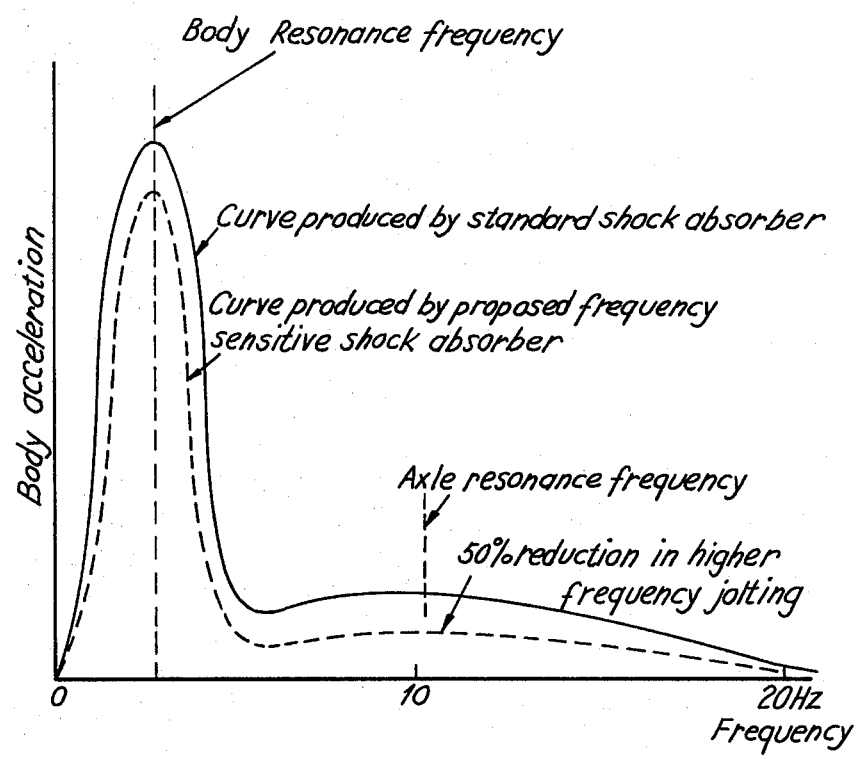
FIG. 3 is a graph showing computer-simulated vehicle response curves for a conventional damper and for a damper embodying the invention.

In FIG. 3, vehicle response curves, produced by hybrid computer simulation of a vehicle traversing a secondary road, are shown comparing the curve for the fluid damper schematically illustrated in FIG. 1 with a curve for a standard fluid damper or shock absorber unequipped with the spring-mass valve arrangement illustrated in FIG. 1. The curves of FIG. 3 illustrate vehicle body acceleration plotted against frequency of displacement of the vehicle axle or wheeel carrier. Generally speaking, it is desirable that the body acceleration be high for very law frequency suspension displacement. At higher frequencies, the body acceleration should be low so that the vehicle passengers are not annoyed by jolting of the body. The greater the degree of damping, the higher is the body acceleration. It may be seen from the curves of FIG. 3 that the degree of damping at body resonance frequencies of around 2 Hz. is almost as great for the frequency responsive fluid damper of the invention as it is for the standard shock absorber. However, at higher frequencies of about 10 Hz., the damping is reduced by about 50 percent as compared to the standard shock absorber.

Figure 4:
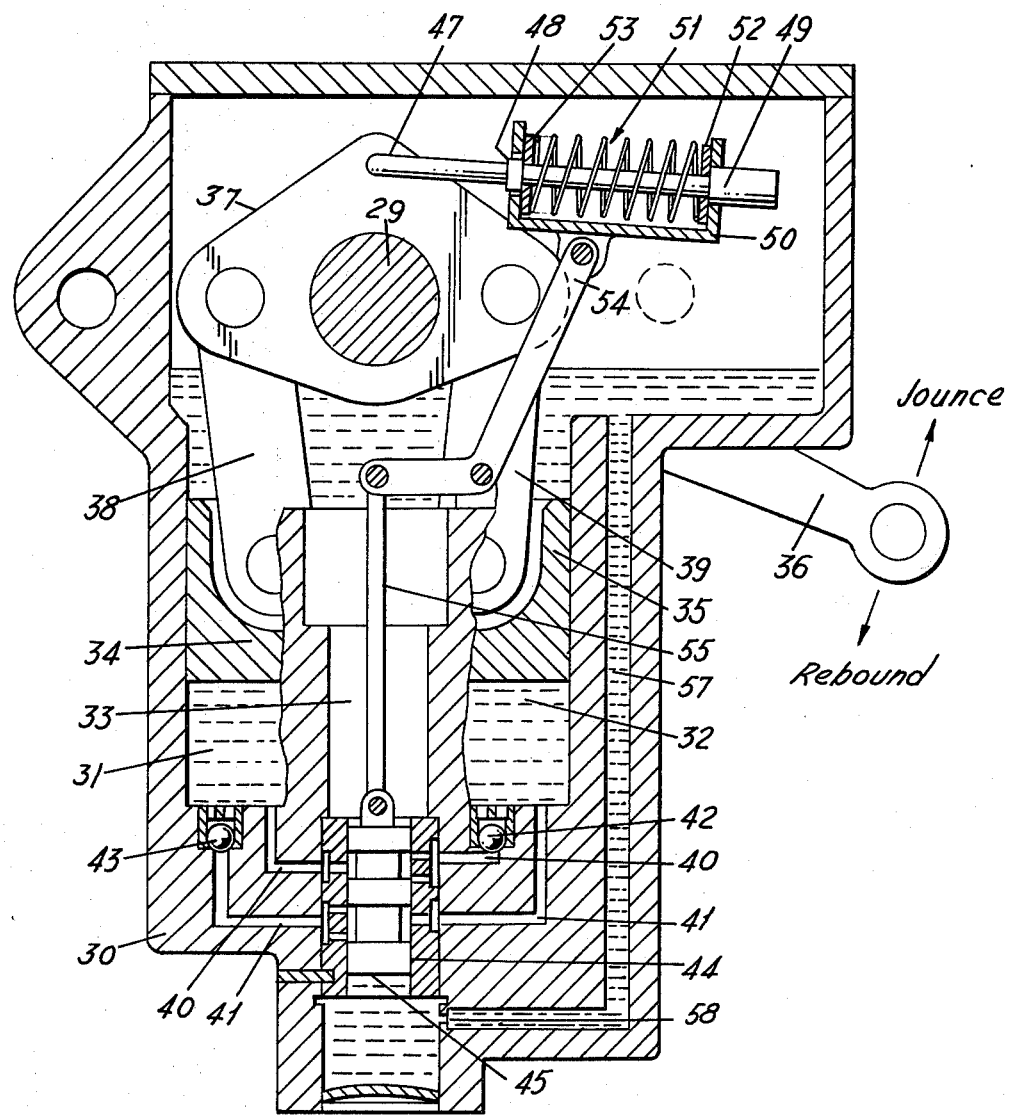
FIG. 4 is a sectional view of an alternative embodiment of the invention.

FIG. 4 shows a more detailed embodiment of the invention which works on the same principle as the diagrammatic embodiment of FIG. 1. A housing or body member 30 is formed with a first chamber 31, hereinafter referred to as a jounce cylinder, and with a second chamber 32, hereinafter referred to as a rebound cylinder. A valve chamber 33 is also formed in the housing 30. The valve chamber 33 is disposed in a different plane than are the jounce and rebound cylinders, and it is in front of them when viewed as shown in FIG. 4. Piston means in the form of a first piston 34 and a second piston 35, hereinafter referred to as jounce and rebound pistons, respectively, are connected to a lever arm 36 and a shaft 29, by a rocker arm 37 and connecting rods 38 and 39 in a manner which is conventional for lever-arm type fluid dampers.

Two passages 40 and 41 in the housing 30 interconnect the jounce and rebound cylinders 31 and 32. A check valve 42 prevents flow through passage 40, hereinafter referred to as the jounce passage, during rebound movements, and another check valve 43 prevents flow through passage 41, hereinafter referred to as the rebound passage, during jounce movements.

A valve body 44 is fixed in the valve chamber 33, and a valve spool 45 is slidable in the valve body 44. The valve spool controls flow in both the jounce and rebound passages. The jounce and rebound sections of the valve each include a single inlet port and twin exhaust ports. The valve spool 45 has an intermediate position (the position shown in FIG. 4) in which all four exhaust ports are open and there is minimum restriction to flow in both passages 40 and 41 and the degree of damping is relatively low. Movement of the valve spool 45 in either direction away from the intermediate position at least partially obstructs one of the exhaust ports of each pair, thereby, restricting flow in both passages and significantly increasing the degree of damping of the fluid damper for both rebound and jounce movements.

The valve spool 45 is connected to the rocker arm 37 through resilient means. In the embodiment shown in FIG. 4, the resilient means comprises a rod 47 which is pivotally connected to the rocker arm 37 and is formed with raised lands 48 and 49. A cradle member 50 is slidably mounted on the lands 48 and 49, and a compression spring 51 urges washers 52 and 53 outwardly against the cradle member 50 or the lands 48 and 49 so that movement of the cradle member 50 in either direction along the rod 47 from the position shown in FIG. 4 causes the spring 51 to be compressed. The cradle member 50 is pivotally mounted on one end of a bell crank lever 54. The bell crank lever is pivotally mounted on the housing 30 and the other end of the bell crank lever is connected by a connecting rod 55 to the valve spool 45.

The valve cylinder 33 is connected to an oil reservoir 56 which serves the jounce and rebound cylinders 31 and 32 and the valve chamber 33 through a passage 57 which has a restriction 58 so that movement of the valve spool 45 relative to the housing 30 is damped. The size of the restriction 58 and the rate of the spring 51 determine the degree of damping of movements of the valve spool 45 and are chosen to give the valve spool a response characteristic similar to that illustrated in FIG. 2, whereby, high frequency movements of the lever arm are taken by the spring 51 with insignificant or negligible displacement of the valve spool 45, and low frequency movements of the lever arm are followed by the valve spool 45.

In operation, the intermediate position of the valve spool 45, as shown in FIG. 4, corresponds to the normal laden position of the suspension. Any high frequency wheel movements, such as ocur for example when a wheel hits a bump or hole as the vehicle travels over an otherwise smooth road, are subjected to a low degree of damping because the valve is in its intermediate position and is unable to follow the rapid suspension movement caused by the bump. However, low frequency vehicle body movements displace the valve spool 45 and increase the degree of damping for both jounce and rebound movements.

Figure 5:
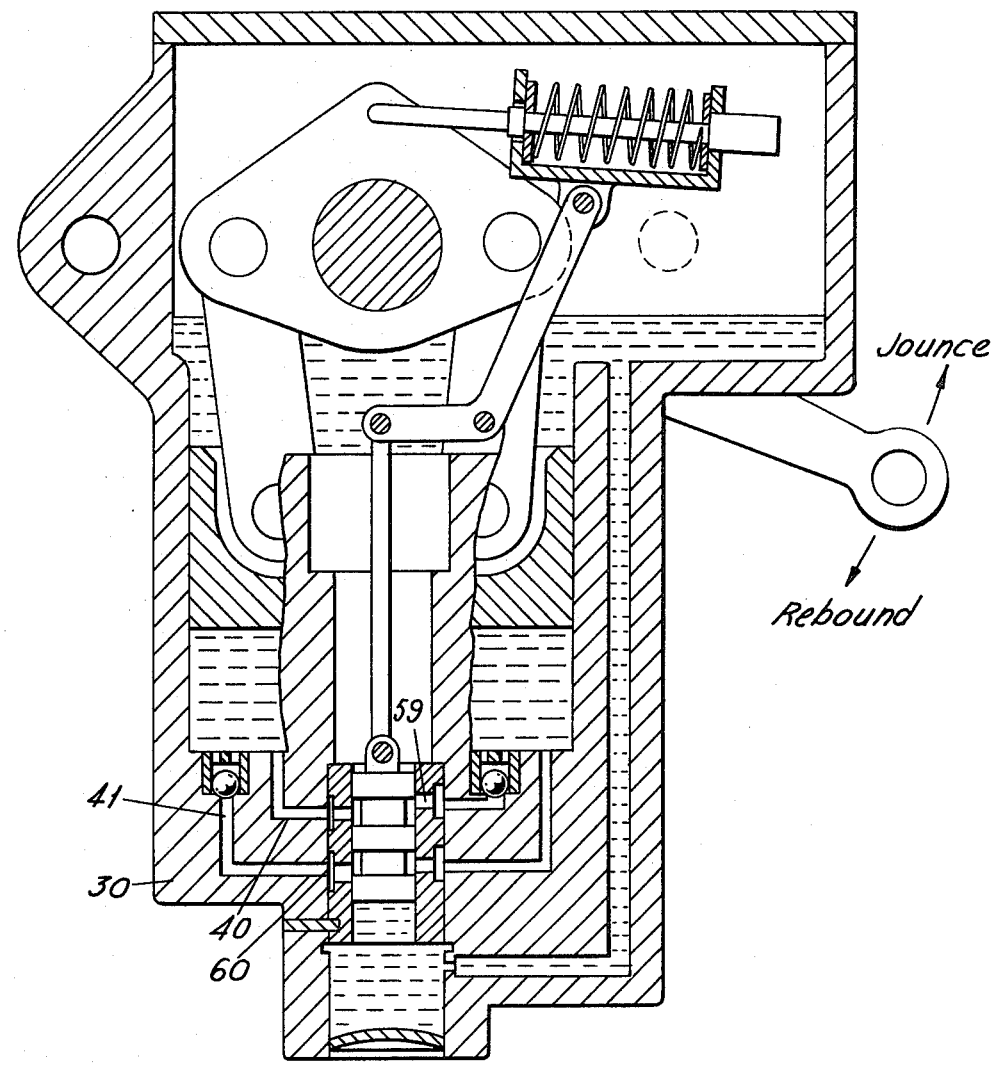
FIG. 5 is a sectional view of an alternative embodiment of the invention.

FIG. 5 shows a further embodiment of the invention, this further embodiment being a modification of that shown in FIG. 4 and differing only in that the arrangement of the exit ports in the valve member 44 have been changed. Single exit ports 59 and 60 are associated with the jounce and rebound passages 40 and 41, respectively. In the intermediate position of the valve spool 45, both exit ports 59 and 60 are partially restricted and the damper preferably has the same intermediate degree of damping for both jounce and rebound movements. Movement of the valve spool in the rebound direction (upwards) causes the exit port 59 to become less restricted and the exit port 60 to become more restricted so that damper then has a decreased amount of damping for jounce movements and an increased amount of damping for rebound movements. Jounce movements of the valve spool produce the opposite effect, that is, an increased amount of damping for jounce movements and a decreased amount of damping for rebound movements. It may be appreciated, however, that the average amount of damping remains substantially constant irrespective of the position of the valve spool.

Thus, in operation, a low frequency rebound movement caused by the body rising above its normal laden position displaces the spool valve upwardly and produces an increased damping of the upward movement of the body. In addition, any high frequency wheel movements superimposed on the low frequency body movements are differentially damped producing a resultant downward force on the body.

Similarly, a low frequency jounce movement caused by the body falling below its normal laden position produces an increased damping of the downward movement of the body. Upward movement of the body as it rebounds to the normal laden position is subject to a decreased degree of damping. During the time that the body is below the normal laden position, any high frequency wheel movements produce a resultant upward force on the body because upward movements of the wheel are damped more than downward movements of the wheel.

The overall effect of this system of damping is that in the absence of high frequency wheel movements, body movements are damped with the normal average damping coefficient of the damper, but in the presence of high frequency wheel movements the damping is effectively increased because the resultant forces produced by the high frequency wheel movements are always in a direction tending to restore the body to its normal laden position.

Figure 7:
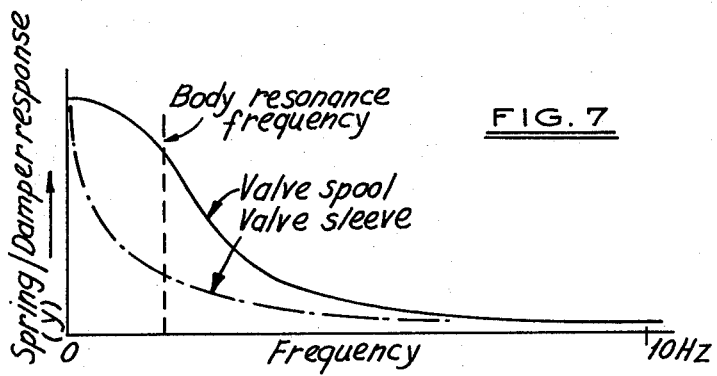
FIG. 7 is a graph showing the variation of valve displacement with frequency for the embodiment of FIG. 6.
Figure 6:
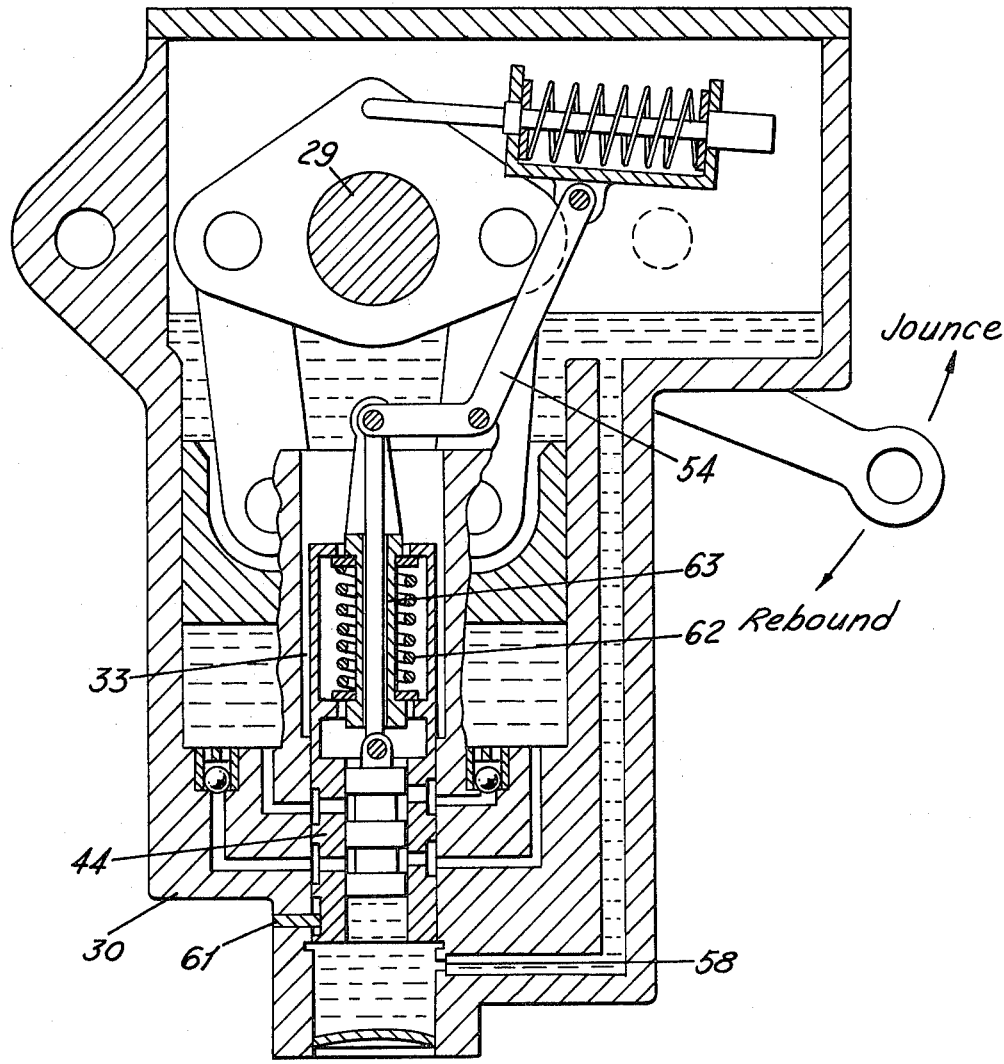
FIG. 6 is a sectional view of a modification of the embodiment of FIG. 4 with provision for compensating for variations in the loading of the vehicle in which the damper is installed.

It is a problem with the embodiments described above that the dampers only work as they are designed to work for a particular laden condition of the vehicle. Any change in the vehicle loading produces a constant displacement of the valve member from its intermediate position. This effect may be turned to an advantage by making the damper have a differential damping effect which produces forces tending to restore the body to its normal laden position. The change in height could be arranged to increase the damping coefficients for more heavily laden conditions. FIG. 6 illustrates an alternative approach in which the position of the valve body 44 is automatically adjusted to compensate for changes in vehicle height. The valve body 44 is slidable in the valve cylinder 33. Movement of the valve body is damped by the restriction 58 and limited by a stop 61. A compression spring 62 mounted within an extension of the valve body 44 connects the valve body to a sleeve 63 pivotally connected to the bell crank lever 54. The spring and damping characteristics are such that the valve body follows the average displacement of the valve spool 45. The response of the valve body is compared in FIG. 7 with the response of the valve spool. The valve body responds only to very low frequency movements, such as those caused by a change in loading of the vehicle.

The invention has been described as applied to a lever-arm type of damper, sometimes referred to as a rotary damper. The principles involved are equally applicable to the telescopic type of damper.

Based upon the foregoing description of the invention, what is claimed and desired to be protected by Letters Patent is:

1. A fluid damper for a vehicle suspension system, which comprises: a housing having first and second chambers therein and having a valve chamber therein, said housing further including first and second flow passages interconnecting said first and second chambers, said flow passages communicating with said valve chamber, said first flow passage including a check valve to permit fluid to flow from said first chamber to said second chamber and to prevent fluid flow in the reverse direction, said second flow passage including a check valve to permit fluid to flow from said second chamber to said first chamber and to prevent flow in the reverse direction; a valve body positioned in said valve chamber, said valve body having first inlet and outlet ports in communication with said first flow passage, and said valve body having second inlet and outlet ports in communication with said second flow passage; a valve spool positioned within said valve body, said valve spool being movable to variably restrict fluid flow between said valve body first and second inlet and outlet ports; a first piston movable in said housing first chamber; a second piston movable in said housing second chamber; a rocker arm; a first rod connecting said rocker arm to said first piston; a second rod connecting said rocker arm to said second piston; a cradle; a compression spring positioned within said cradle; a rod attached to said rocker arm, said rod passing through said compression spring, said rod having spaced raised lands, said compression spring being confined between said spaced raised lands; and a bell crank lever pivotally attached to said housing, one end of said bell crank lever being attached to said cradle and an other end of said bell crank lever being attached to said valve spool.

2. A fluid damper for a vehicle suspension system in accordance with claim 1 which further includes means for supplying fluid to said valve chamber.

References Cited

UNITED STATES PATENTS

| 1,871,931 | 8/1932 | Walters | 188—283 |
| 1,522,243 | 1/1925 | Hughes, Jr. | 188—283 |
| 1,967,833 | 7/1934 | Livermore et al. | 188—283 |
| 2,162,292 | 6/1939 | Armstrong | 188—283 |

FOREIGN PATENTS

| 1,023,346 | 1/1958 | Germany | 188—283 |
| 931,816 | 8/1955 | Germany | 188—303 |

GEORGE E. A. HALVOSA, Primary Examiner

U.S. Cl. X.R.

188—303